United States Patent [19]

Royer et al.

[11] Patent Number: 4,872,196
[45] Date of Patent: Oct. 3, 1989

[54] TELEPHONE KEYPAD INPUT TECHNIQUE

[75] Inventors: Paul Royer, Prospect Heights; George W. Schaupp, Jr., Schaumburg, both of Ill.

[73] Assignee: Motorola, Inc., Schaumburg, Ill.

[21] Appl. No.: 220,197

[22] Filed: Jul. 18, 1988

[51] Int. Cl.⁴ ............................................. H01J 7/04
[52] U.S. Cl. ....................................... 379/58; 379/97; 379/63; 341/28
[58] Field of Search .................. 340/365 VL, 365 R; 400/110, 484, 95, 94, 93, 92, 91; 379/58, 63, 97

[56] References Cited

U.S. PATENT DOCUMENTS

| | | | |
|---|---|---|---|
| 3,557,927 | 1/1971 | Wright et al. | 400/95 |
| 4,327,421 | 11/1982 | Wang | 364/900 |
| 4,498,143 | 2/1985 | Strzelecki | 364/900 |
| 4,500,872 | 2/1985 | Huang | 340/365 R |
| 4,505,602 | 3/1985 | Wong | 400/110 |
| 4,532,378 | 7/1985 | Nakayama et al. | 379/110 |
| 4,602,878 | 7/1986 | Merner et al. | 400/110 |
| 4,632,578 | 12/1986 | Cuff et al. | 400/91 |
| 4,684,926 | 8/1987 | Yong-Min | 340/365 R |
| 4,698,758 | 10/1987 | Larsen | 364/419 |
| 4,737,040 | 4/1988 | Moon | 400/110 |

FOREIGN PATENT DOCUMENTS 277869  11/1987  Japan ...................... 379/97

Primary Examiner—Robert Lev
Attorney, Agent, or Firm—Rolland R. Hackbart

[57] ABSTRACT

Japanese language symbols are entered into a telephone keypad for storage in subsequent name/number recall memory. The kata-kana symbol matrix is used to represent the Japanese language. The matrix is stored in memory and selected keys on a keypad are used to progress through the matrix to identify selected entries within the matrix.

11 Claims, 1 Drawing Sheet

TELEPHONE KEYPAD INPUT TECHNIQUE

FIELD OF THE INVENTION

The present invention relates generally to telephone keypad entry methods, and, more particularly, to the practice of cellular telephone keypad entry for the Japanese language.

DESCRIPTION OF THE PRIOR ART

There is essentially one known technique for entering coded data using a telephone keypad. The technique is directed to an alphabetized language, e.g., the English language. It utilizes the alphabetized labeling of the digits on the telephone keypad. E.g., digit "2" is labeled with the letters "ABC", digit "3" is labeled with the letters "DEF", etc. To enter a selected letter into the telephone, the user selects the entry mode, e.g., using "*", and depresses a digit having the desired letter labeling once, twice or thrice depending on whether the selected letter is the respective first, second or third letter that is labeled on the digit. The entry of each letter is finalized using another mode key, e.g., "#", and each letter is finalized using yet another mode key, e.g. two successive depressions of #. E.g., to enter the word "DEAD", the user would depress:

*, 3, #, 3, 3, #, 2, #, 3, #
"D"   "E"   "A"   "D".

Unfortunately, some languages do not have such an alphabet and therefore cannot accommodate the above described keypad entry technique.

OBJECT OF THE PRESENT INVENTION

It is an object of the present invention to provide an efficient and simple technique and device for entering symbols representing the Japanese language into a telephone keypad.

DETAILED DESCRIPTION OF THE PREFERRED EMBODIMENT

Figure 1:
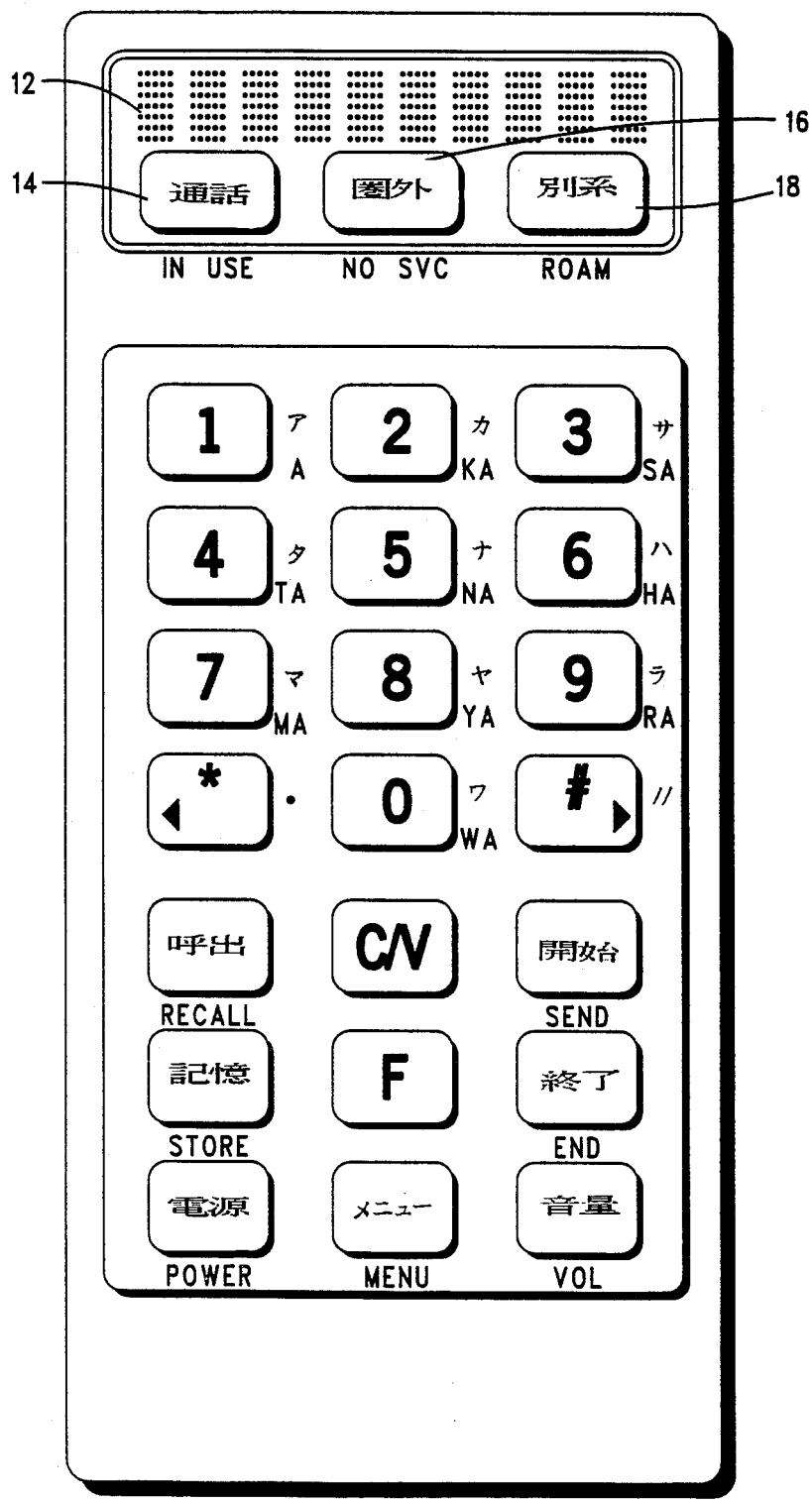
FIG. 1 is a block diagram of a cellular telephone instrument, according to the present invention.

The present invention overcomes the aforementioned problems by providing a telephone instrument that includes data memory for retaining the known kata-kana sound matrix representative of the Japanese language. The inventive telephone instrument includes a key pad useful for selecting entries in a kata-kana (or hira-gana) sound matrix and a display useful for indicating the progression of the matrix entry selection to the telephone instrument user.

FIG. 1 illustrates a telephone instrument, directed toward RF cellular communication use. This telephone instrument 10 includes a digital display 12 having three cellular-related conventional indicators: an "in use" indicator 14, a "no service" indicator 16 and a "roam" indicator 18.

The telephone instrument may be implemented using those circuits illustrated and described in "DYNATAC Cellular Mobile Telephone Instruction Manual", Motorola Publication No. 68P81070E40, available from Motorola C & E Parts, 1313 E. Algonquin Road, Schaumburg, Illinois, 60196, incorporated herein by reference. The programming of the telephone instrument is modified and adapted to accommodate the following entry technique.

The telephone instrument 10 also includes a keypad 20 having a set of twelve keys arranged in a manner that is conventional to most telephone instruments. Additionally included with the keypad is a set of nine keys arranged in a manner that is conventional to many cellular telephone instruments. The arrangement of the twelve keys includes labeling that is partly conventional and partly novel, the novel part being an aspect of the present invention. The conventional labeling includes labeling the keys in numerical order (left to right, top to bottom): 1, 2, 3, 4, 5, 6, 7, 8, 9, *, 0 (zero), #. The novel part of the labeling includes a symbol from the kata-kana matrix disposed adjacent to each key labeled with one of the numbers from 1-9 (not including the keys labeled with "*" and "#"). The kata-kana matrix preferably includes five rows and ten columns labelled, K, S, T, N, H, M, Y, R and W, and is illustrated below.

| KATAKANA MATRIX | | | | | | | | | |
|---|---|---|---|---|---|---|---|---|---|
| — | K | S | T | N | H | M | Y | R | W |
| ア A | カ KA | サ SA | タ TA | ナ NA | ハ HA | マ MA | ヤ YA | ラ RA | ワ WA |
| イ I | キ KI | シ SHI | チ CHI | ニ NI | ヒ HI | ミ MI |  | リ RI |  |
| ウ U | ク KU | ス SU | ツ TSU | ヌ NU | フ FU | ム MU | ユ YU | ル RU |  |
| エ E | ケ KE | セ SE | テ TE | ネ NE | ヘ HE | メ ME |  | レ RE |  |
| オ O | コ KO | ソ SO | ト TO | ノ NO | ホ HO | モ MO | ヨ YO | ロ RO | ヲ WO |

The key labeled with "*" may also be labeled with an associated cursor (e.g., <), while the key labeled with "#" sign may be labeled with a different type of cursor (e.g., >). Additionally, the key labeled with "*" may also have associated with it labeling indicative of "o" while the key labeled with "#" sign may have associated with it labeling indicative of ". The reasons for the above labeling will become apparent with the discussion below.

Japanese pronunciation is composed of 50 basic sounds. A full set of "kana" has one symbol for each sound.

Japanese pronunciation includes only 5 vowel sounds with no variations.

Each "kana" symbol/sound is made up of either a vowel, or a consonant with a vowel. These sounds are commonly represented in the above kata-kana matrix.

One noted exception is "N", the only pure consonant which does not fit on the above matrix. There is also "WO" which is almost unused in names today.

There is one variation of consonant columns K, S, and T of the above matrix which sound like:

| GA | ガ | ZA | ザ | DA | ダ |
| GI | ギ | JI | ジ | DI | ヂ |
| GU | グ | ZU | ズ | DZU | ヅ |
| GE | ゲ | ZE | ゼ | DE | デ |
| GO | ゴ | ZO | ゾ | DO | ド |

These sounds are identified by adding a "ten-ten", or "to the basic symbols.

The H column has two variations which sound like:

| BA | バ | PA | パ |

| | | | |
|---|---|---|---|
| BI | ビ | PI | ピ |
| BU | ブ | PU | プ |
| BE | ベ | PE | ペ |
| BO | ボ | PO | ポ |

The "B" sounds are identified by adding a ' to the basic symbol, while the "P" sounds are identified by adding a little circle in the upper right hand corner that looks like a "degree" mark.

In rare instances, the "U" symbol is used with a ten-ten to represent the "V" sound.

Another consideration regarding "kata-kana", is that one of the two "kana" varieties includes a bar ("-") which is often used to extend the vowel sound an extra beat.

While "kana" has small symbols to represent A, I, U, E, O, TSU, YA, YU, and YO; except for "TSU", and perhaps the small YA, YU, YO, these small symbols are not necessary for cellular phone (name) input. If small YA, YU, YO are used, they may conveniently follow the big YA, YU, YO in sequence using the key having "8" as a label.

Similar to the operation of U.S. cellular phones, there is no need for punctuation marks.

Considering the above constraints, the full "kana" set comprises 47 basic symbols (including "N", small "TSU", and "-"), and 2 symbol modifiers (ten-ten (') and the degree mark (o)).

One preferred embodiment of the present invention includes the "kana" symbols shown on the set of 12 number keys themselves. "Kana" symbols and modifiers are shown on the escutcheon above the keys, as illustrated in Fig. 1.

For example, above the "1" there would be the representative Japanese "A" symbol. After switching to the "kana" entry mode, the first hit on the "1" key would light up a "1" on the display. The second hit would light up (kata-kana) "A". Successive hits would scroll through the "no-consonant" column of "kana" characters "I", "U", "E", "O".

In similar fashion, there would be a "KA" symbol on the escutcheon above the "2", and after entering the "kana" input mode, successive hits would sequence through "2", "KA", "KI", "KU", "KE", "KO".

The only exception would be the "0" (zero) key which could sequence through "0" (zero), "WA", "N", small "TSU", and "-".

Before finally registering a symbol in the display, a ten-ten or a degree mark could be entered to modify a symbol. On the 12 key number pad, "#" could be ten-ten and "*" could be the degree mark.

The chosen symbol would then be registered in the display using conventional mode key techniques, and the user could go on to the next entry.

Naturally, these symbols that are input are useful for subsequent phone number recall, via memory, just as alpha-numeric characters are with cellular phones in the U.S.

As an example, consider entering the name "Suzuki" (Su-Zu-Ki). After designating the entry mode, the following succession of keys is entered: 3333 (Su), "store" key (indicating the selection of the sound), 3333 (Su), #(modify previous Su to Zu), #(indicating the selection of the sound), 222 (Ki), "store" key (indicating the selection of the sound), the display then shows the Japanese kata-kana representations for these sounds, and, finally, exiting the entry mode using a designated function key.

A second preferred embodiment requires a single "rocker" key (preferably a momentary double throw single pole switch), and may require as many as 15 hits to get through the matrix. The key labeled with "C / V" (for consonant sound and vowel sound, respectively) indicates use of this key as the rocker key. The two keys * and #are still used for symbol modifiers in this embodiment.

With this method, rocking left causes the display to scroll across the top of the "consonant columns". Once in the proper column, rocking right causes the display to scroll down a column.

For example, using the key labeled #, getting to "RO" would require depressing the rocker key left through "A", "KA", "SA", "TA", "NA", "HA", "MA", "YA", RA", and then depressing right through "RI", "RU", "RE", RO". Each selection of the sound initializes the position in the matrix to "A" sound at the upper left corner.

Again, the modifiers would work similar to that described above where they would be input with separate keys before final registration on the display.

As an example with this preferred embodiment, consider entering the name "Suzuki" (Su-Zu-Ki). After designating the entry mode, the following succession of rocking is entered: left-left-right-right (Su), "store" key (indicating the selection of the sound), left-left-right-right (Su), #(modify previous Su to Zu), "store" key (indicating the selection of the sound), left-right (Ki), "store" key (indicating the selection of the sound), the display then shows the Japanese representation of these sounds, and, finally, exiting the entry mode using a designated function key.

For either of the above two embodiments, the key labeled with both * and the cursor pointing to the left, is useful for backing up over a selected sound and re-entering from that point.

Accordingly, the present invention, as set out in the following claims, provides a simple and efficient method for entering language symbols, e.g. of the Japanese language, into a telephone keypad. The technique is useful not only for cellular telephones, but also for standard-type telephones and similar devices requiring symbol entry.

We claim:

1. A method for entering one of a plurality of phonetic language symbols into a telephone apparatus having a keypad with at least one key for producing a first key signal and a second key signal, comprising:
   providing a language symbol matrix having rows and columns and entries corresponding to an intersection of the rows and columns, each entry corresponding to one of the plurality of phonetic language symbols;
   selecting the first key signal a selected number of times to progress along the rows of the matrix;
   selecting the second key signal a selected number of times to progress along the columns of the matrix to designate an entry; and
   providing an input signal to the telephone to indicate the selection of the designated entry.

2. A method for entering language symbols into a telephone apparatus, according to claim 1, wherein said keypad includes a single rocker key.

3. A method for entering language symbols into a telephone apparatus, according to claim 1, wherein said keypad includes a first key for producing the first key signal and a second key for producing the second key signal.

4. A method for entering Japanese language kata-kana symbols into a cellular telephone apparatus having a memory and a keypad with a plurality of keys, comprising:

providing data in the memory in a form representing a kata-kana symbol matrix having a plurality of representative sound sequences;

designating keys of the telephone keypad with a symbol representing at least one of said representative sound sequences;

selecting a designated key in succession a selected number of times to designate a desired representative sound in the matrix;

providing a first input signal to the cellular telephone to indicate the selection of the designated representative sound in the matrix;

repeating the previous two steps using different designated keys in order to build a word from the selected representative sounds; and providing a second input signal to the cellular telephone to indicate the selection of the word.

5. A method for entering Japanese language kata-kana symbols into a cellular telephone apparatus, according to claim 4, wherein said keypad includes a store key for producing the first input signal.

6. A method for entering Japanese language kata-kana symbols into a cellular telephone apparatus, according to claim 4, wherein said keypad includes a function key for producing the second input signal.

7. A method for entering language symbols into a telephone apparatus, according to claim 1, wherein said keypad includes a store key for producing the input signal.

8. A method for entering language symbols into a telephone apparatus, according to claim 1, further including the steps of:

repeating the previous three steps in order to build a word from the selected entries; and providing a second input signal to the telephone to indicate the selection of the word.

9. A method for entering language symbols into a telephone apparatus, according to claim 8, wherein said keypad includes a function key for producing the second input signal.

10. A method for entering Japanese language kata-kana symbols into a cellular telephone apparatus having a memory and a keypad with a plurality of keys, comprising:

providing data in the memory in a form representing a kata-kana symbol matrix having a plurality of representative sound sequences;

designating keys of the telephone keypad with a symbol representing at least one of said representative sound sequences;

selecting a designated key in succession a selected number of times to designate a desired representative sound in the matrix; and providing an input signal to the cellular telephone to indicate the selection of the designated representative sound in the matrix.

11. A method for entering Japanese language kata-kana symbols into a cellular telephone apparatus, according to claim 10, wherein said keypad includes a store key for producing the input signal.

* * * * *